March 2, 1943.  A. RUEGGER  2,313,023
TILTABLE SEAT
Filed Sept. 3, 1938  2 Sheets—Sheet 1
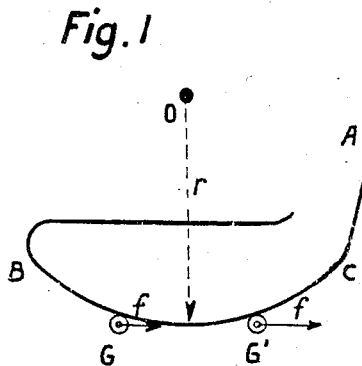
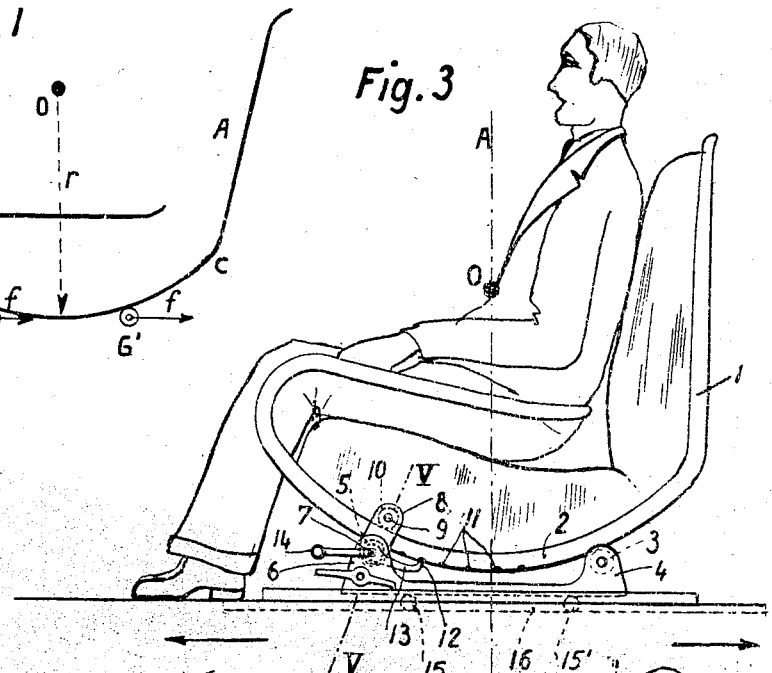
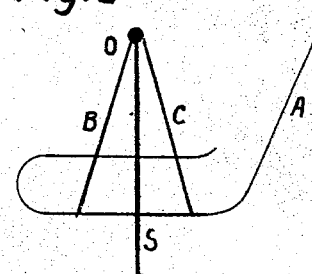
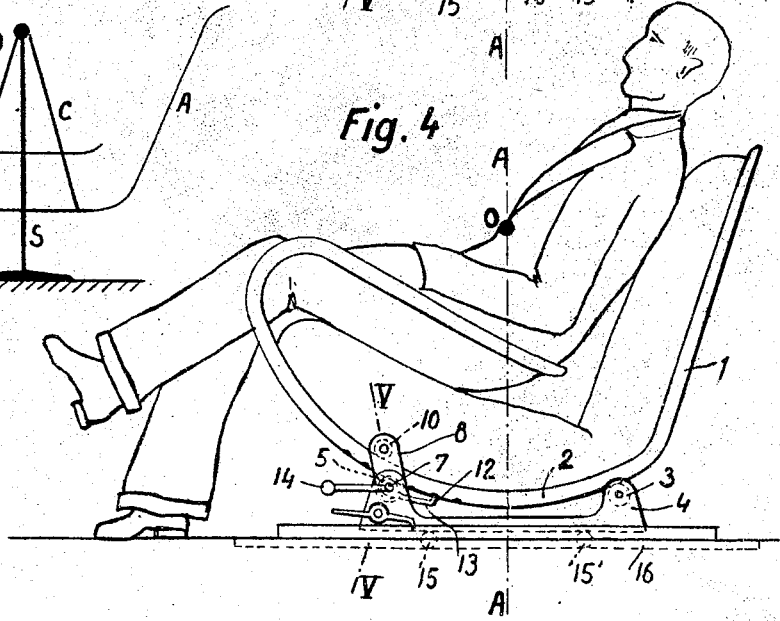
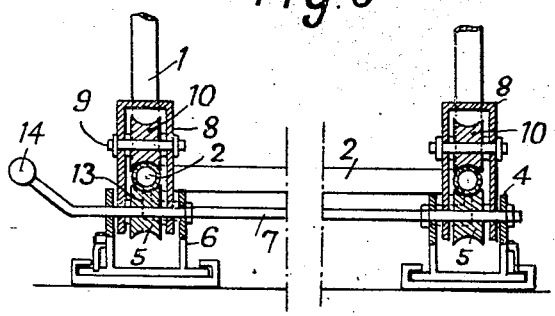
INVENTOR.
ANDRÉ RUEGGER.
BY
ATTORNEY.

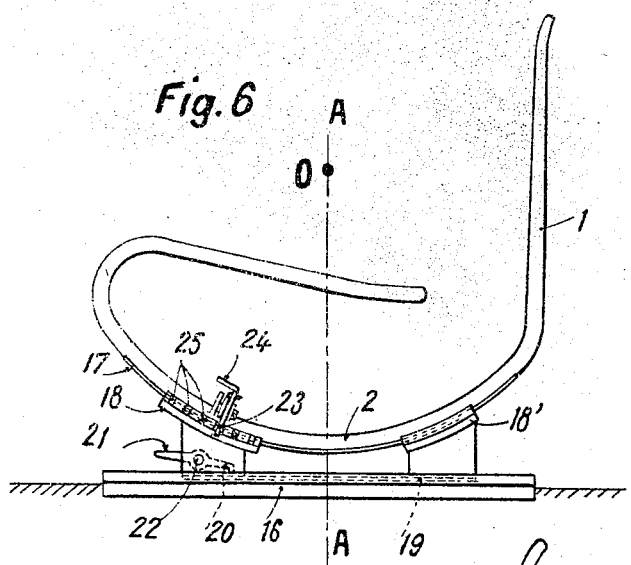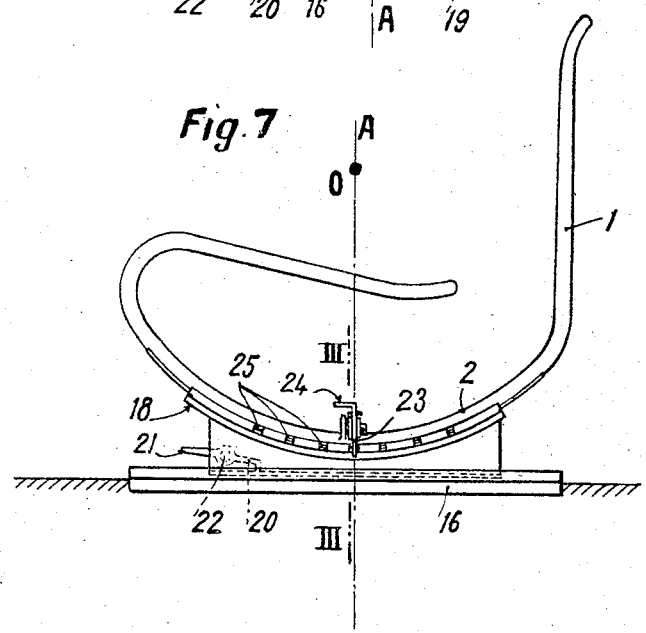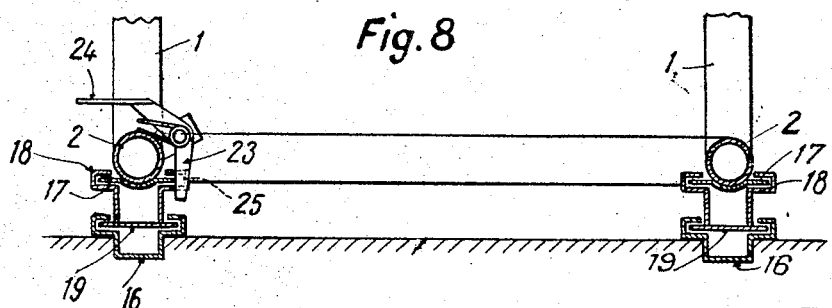

Patented Mar. 2, 1943

2,313,023

UNITED STATES PATENT OFFICE 2,313,023

TILTABLE SEAT

André Ruegger, Levallois-Perret, France; vested in the Alien Property Custodian

Application September 3, 1938, Serial No. 228,364
In France September 7, 1937

6 Claims. (Cl. 155—116)

It is known that it may be pleasant to modify the slope of any seat at will.

In the case of a vehicle seat, the possibility of making the slope of the seat variable, furthermore has a very great physiological advantage owing to the fact that the organs and the muscles of the body can receive, at different angles and in several positions of equilibrium, the various impulses which are imparted to them by the vehicle. This produces an impression of relaxation on the occupant of the seat in question.

Several devices have been constructed for this purpose, but they have the drawback of operating by raising either the front, or the rear of the seat. These movements result in the arc of a circle described in particular by the head of the occupant of the seat and by certain of his joints (elbow, shoulder, knee) about the pivot point, producing movements that are inconvenient either for the angle and the height of the line of sight (height of the eye) or for the respective positions of the arms, the shoulders, the legs relatively to the various control members (steering wheel, joy-stick, levers, pedals, rudder, etc.), of the vehicle.

The purpose of the present invention is to overcome these drawbacks.

The invention has for its object a seat in which the pivotal axis is no longer located on a level with its base, but on a line adjacent the centre of gravity of the occupant of the seat. In this manner, whatever be the position occupied by the seat as a result of a tilting movement, the centre of gravity of the human body is always located substantially at the same distance from the bearing or supporting members, which distance is represented by the radii of the curve which moves over said bearing members or which is described by the supporting members.

Another advantage of this arrangement consists in the fact that it enables the seat to be readily moved between each of its positions, the equilibrium of the body being maintained nearly constant relatively to the pivotal axis.

The invention provides a seat to which these principles are applied, which is furthermore characterized by a very rational construction and which includes means which enable the seat to be held stationary in the positions in which it is adjusted to suit the person who is occupying it.

The invention is illustrated, by way of example, in the accompanying drawings in which:

Fig. 1 is a diagram explaining a method of applying the principle of the invention.

Fig. 2 is likewise a diagram explaining another embodiment of the same principle.

Fig. 3 is an elevation of a seat in its position which enables the person who is occupying it to sit normally.

Fig. 4 is a similar side elevation showing this same seat tilted backwards.

Fig. 5 is a partial transverse sectional elevation taken substantially along the line V—V of Figs. 3 and 4, looking in the direction of the arrows.

Fig. 6 is a side elevation of a seat according to a modification.

Fig. 7 is a side elevation showing another modification.

Fig. 8 is a sectional elevation along the line III—III of Fig. 7.

According to the diagram of Fig. 1, the seat A has a lower part B—C which coincides with an arc of a circle of which the radius is $r$ and which has its centre at the point O (this point may be chosen and located at any desired spot in order to fulfill the condition of being adjacent the centre of gravity of the occupant) and which can roll on two rollers G and G' which are tangential to the arc of a circle.

The axles of said rollers are secured to a frame which can accessorily slide, relatively to the floor on which the seat is mounted, in the direction shown by the arrows or in the opposite direction, for example in appropriate slide-ways. Two locking devices are provided, one of which locks the arc-shaped element B—C at any point of its rolling movement on the rollers G, G' and the other locks the frame which supports the rollers, at any point of the slide-way.

The diagram of Fig. 2 illustrates a second possibility of applying the principle of the invention. In this case, the seat A is suspended by arms B, C in such a manner as to swing about the pivot O which is secured to the support 3 fixed to the floor, with or without the interposition of a slideway. The pivot O is located at a point that is chosen and calculated as in the previous example, that is to say adjacent the centre of gravity of the occupant of the seat.

The seat according to the exemplary embodiment of Figs. 3 to 5 comprises two side frames 1, for example made of metal tube, which are connected together by cross-pieces to form a rigid frame. According to the invention, the curvature of the lower part 2 of these side frame elements is described about the centre O which substantially coincides with the centre of gravity of the body of the occupant of the seat. Said side frames are mounted at the rear on a roller 3 which is rotatably mounted on lugs 4 which extend upwards from the floor or from the base that is placed on the floor. At the front, the lower part of said frames bears on supporting rollers 5 which are likewise mounted on lugs 6 extending upwards from the base, from the floor or from a carriage which can slide in the desired direction in slide-ways which are fixed to the floor. The axle 7 which carries said rollers 5 also supports jaws 8 which are pivoted about said axle and each carry at their upper part a guide roller 10 mounted on an axle 9. The rollers 3, 5 and 10 may be shaped at their periphery so as to have a groove which fits over the tube 2 of the frame. The jaws 8 are pivoted about the axle 7, which enables them to perform an angular movement corresponding to the tilting movement of the tube of the seat.

Furthermore, the tube 2 is provided, at its underside, with notches or recesses 11 in which engage the claw 12 of a locking latch 13 which is secured to the axle 7. This latter terminates at its outer part by a knob 14 which enables it to be rotated to release the claw 12 of the latch 13 from the notch 11 in which it is placed, in order to change the position of the arm-chair by imparting to it a rolling movement on the rollers 3 and 5, the roller 10 forming with the jaws 8 a retaining member which prevents the tubes or other elements of the frame of the arm-chair from being lifted off the front bearing rollers 6.

In order to change from the upright sitting position of Fig. 3 to the backwardly inclined position of Fig. 4, it suffices to release the claw 12 of the latch 13 from the notch it occupies by operating the knob or lever 14, optionally against the action of a retracting spring which tends to urge the claw 12 of the latch 13 into the notches 11, then to push the arm-chair forwards for example by acting on the back, causing it to roll on the rollers 3 and 5. When the passenger has brought his arm-chair into the position he wishes, it suffices for him to let go the knob 14. The latter brings back the claw 12 of the latch 13 into one of the notches, either by forming a counterweight, or under the action of the above mentioned retracting spring. Whatever be the position chosen by the passenger, his arm-chair is thus fixedly secured on the supporting base by means of the locking device described, on the one hand, and to the guide rollers 10 on the other hand. The pivoting of the guide rollers 10 by means of the pivoted jaws 8 enables said rollers to take up in each case the suitable relative position with respect to the bearing rollers 5 for holding the arm-chair and preventing any untimely lifting of the front of said arm-chair. The base can be made in the shape of a carriage which slides in the direction of the arrows (Fig. 3) by means of rollers or slides 15, 15¹ in a slide-way 16 embedded in the floor, which is shown in dotted lines in Fig. 3. Owing to the above described curvature of the lower elements 2 of the frame of the arm-chair, the centre of gravity is always equidistant from the two bearing rollers 5 and 3, which are in all cases placed at the ends of radii of the curve described about said centre O, since said curve is that of the lower elements 2 of the seat. The gravity of the body of the occupant of the seat is therefore always exerted along a vertical A—A which passes exactly through the middle of the distance between the rollers 3 and 5, that is to say whatever be the position of the seat, the gravity of the body of the person who occupies it is directed towards the centre of the base which is at an equal distance from the four bearing rollers (two rear rollers 3 and two front rollers 5).

This invariable direction of the gravity of the human body ensures perfect seating and stability for the person who is occupying the seat, whatever be his position and this is an extremely useful result in vehicles, since it enables the passengers to place their seats in various positions to relax themselves, while retaining the same stability in all the positions.

As in the embodiment of Figs. 3–5, in the modifications of Figs. 6 to 8 the seat is provided with side frames 1 made of metal tube which are connected together by cross-pieces to form a frame and the curvature of the lower part 2 of said side frame-elements is preferably described about the centre O which substantially coincides with the centre of gravity of the body of the occupant of the seat.

In this case, a metal strip 17 is welded under the lower tube 2 and is fitted into a slide-way 18 which is itself secured to a metal strip 19 which can slide in the slide-way 16 which is secured to the floor. The movement of the metal strip 19 in the slide-way 16 thus enables the seat to be adjusted by moving it forwards or backwards on the floor, whereas the sliding of the metal strip 17 in the slide-way 18 enables the seat to be adjusted by swinging it about the centre O. The metal strip 17 and the slide-way 18 have of course the same curvature as the lower part 2 of the frame made of metal tube.

In Fig. 6, only sections of a slide-way 18, 18' are used, whereas in the modification of Fig. 7, the slide-way 18 is continuous. It is of course possible to conceive other modifications of construction while remaining within the scope of the invention.

In order to lock the seat in its positions of adjustment, locking devices are associated with the two sliding systems. For example, a pawl 20 having a lever 21 and pivoted about a pin 22 which is secured to the carriage sliding on the floor, can engage in notches provided in the slide-way and lock the sliding assembly relatively to said slide-way. On the other hand, a latch 23 having a lever 24 is adapted to engage with notches 25 formed in the slide-way 18 and to lock the tube 2 and its metal strip 17 relatively to said slideway 18.

These locking devices are moreover only shown by way of example and may be replaced by any appropriate locking means.

However, it is particularly advantageous to arrange one of the levers or both the levers for controlling the locking members on the side of the seat, preferably within reach of the person seated, so as to enable him to adjust his seat as he wishes without getting up. The invention therefore covers this advantageous novel feature.

Although the invention has been described in the preferred embodiment in which the frame is formed by elements made of metal tube, it is obvious that the seat may also be constructed with other materials without exceeding the scope of the invention. Similarly, the constructional details such as the device for locking or holding the seat stationary, the system for mounting the bearing rollers and even the pivoted jaw device only form individual features and the principle of the invention can be applied with equivalent elements.

The invention extends moreover to the devices described which enable seats to be made tiltable, independently of the seats proper which are mounted on these supports.

I claim:

1. A tiltable seat, comprising curved elements the centre of curvature of which substantially coincides with the centre of gravity of the body of the person seated in the seat, a base fixed to the floor, two rollers rotatably mounted on each side of this base in lugs extending upwards from said base and supporting said curved elements, a guide roller rotatably mounted on each side in jaws which are pivoted on the axle of the front rollers in such a manner as to hold the lower curved elements of the seat on the top in variable positions according to the position of said curved elements.

2. Tiltable seat comprising curved elements the centre of curvature of which substantially coincides with the centre of gravity of the body of the person seated in the seat, a base fixed to the floor, two rollers rotatably mounted on each side of this base in lugs extending upwards from said base and supporting said curved elements, a guide roller rotatably mounted on each side in jaws which are pivoted on the axle of the front rollers in such a manner as to hold the lower curved elements of the seat on the top in variable positions according to the position of said curved elements, stop members provided on said curved elements, a locking device mounted on the base and engaging said stop members.

3. Tiltable seat comprising curved elements the centre of curvature of which substantially coincides with the centre of gravity of the body of the person seated in the seat, a base fixed to the floor, two rollers rotatably mounted on each side of this base in lugs extending upwards from said base and supporting said curved elements, a guide roller rotatably mounted on each side in jaws which are pivoted on the axle of the front rollers in such a manner as to hold the lower curved elements of the seat on the top in variable positions according to the position of said curved elements, notches provided in one of the curved lower elements, a latch secured to the axle of the front roller and engaging said notches.

4. Tiltable seat comprising curved elements the centre of curvature of which substantially coincides with the centre of gravity of the body of the person seated in the seat, a base fixed to the floor, two rollers rotatably mounted on each side of this base in lugs extending upwards from said base and supporting said curved elements, a guide roller rotatably mounted on each side in jaws which are pivoted on the axle of the front rollers in such a manner as to hold the lower curved elements of the seat on the top in variable positions according to the position of said curved elements, notches provided in one of the curved lower elements, a latch secured to the axle of the front roller and engaging said notches, a lever arm secured to the axle of the front roller, an operating knob to the end of this lever arm and serving as a counterweight for urging the point of said latch into engagement with one of the said stop notches.

5. Tiltable seat comprising curved elements the centre of curvature of which substantially coincides with the centre of gravity of the body of the person seated in the seat, a base fixed to the floor, two rollers rotatbaly mounted on each side of this base in lugs extending upwards from said base and supporting said curved elements, a guide roller rotatably mounted on each side in jaws which are pivoted on the axle of the front rollers in such a manner as to hold the lower curved elements of the seat on the top in variable positions according to the position of said curved elements, notches provided in one of the curved lower elements, a latch secured to the axle of the front roller and engaging said notches, a lever arm secured to the axle of the front roller, an operating knob to the end of this lever arm, a retracting spring tending to urge the latch into engagement with the said stop notches.

6. Tiltable seat comprising a frame formed by metal tubes having curved elements the centre of curvature of which substantially coincides with the centre of gravity of the body of the person seated in the seat, a base fixed to the floor, two rollers rotatably mounted on each said side of this base in lugs extending upwards from base, said rollers being provided with grooves which fit accurately over said tube and supporting said curved elements, a guide roller also provided with a groove and rotatably mounted on each side in jaws which are pivoted on the axle of the front rollers in such a manner as to hold the lower curved elements of the seat on the top in variable positions, notches provided in one of the curved lower elements, a latch secured to the axle of the front roller and engaging said notches, a lever arm secured to the axle of the front roller, an operating knob to the end of this lever arm, means urging said latch into engagement with said notches.

ANDRÉ RUEGGER.